United States Patent
Das et al.

(10) Patent No.: US 7,809,597 B2
(45) Date of Patent: *Oct. 5, 2010

(54) PROGRESSIVE REFINEMENT MODEL FOR BUSINESS PROCESSES

(75) Inventors: Manoj Das, Fremont, CA (US); John Liang, Los Altos, CA (US); Peter Lim, Hillsborough, CA (US); Emanuel Gerald Noik, Santa Clara, CA (US); Doug Smith, Saratoga, CA (US); Rahim Yaseen, Redwood City, CA (US)

(73) Assignee: Siebel Systems, Inc., San Mateo, CA (US)

( * ) Notice: Subject to any disclaimer, the term of this patent is extended or adjusted under 35 U.S.C. 154(b) by 1219 days.

This patent is subject to a terminal disclaimer.

(21) Appl. No.: 11/123,460

(22) Filed: May 5, 2005

(65) Prior Publication Data

US 2007/0226022 A1 Sep. 27, 2007

(51) Int. Cl.
*G06F 17/50* (2006.01)
(52) U.S. Cl. .............................. 705/9; 705/7
(58) Field of Classification Search ............ 705/7
See application file for complete search history.

(56) References Cited

U.S. PATENT DOCUMENTS

| | | | |
|---|---|---|---|
| 5,630,069 A | 5/1997 | Flores et al. | 705/7 |
| 5,745,901 A | 4/1998 | Entner et al. | 707/103 R |
| 5,953,707 A | 9/1999 | Huang et al. | 705/10 |
| 6,023,572 A | 2/2000 | Lautzenheiser et al. | 703/2 |
| 6,038,538 A | 3/2000 | Agrawal et al. | 705/7 |
| 6,055,519 A | 4/2000 | Kennedy et al. | 705/80 |
| 6,088,679 A | 7/2000 | Barkley | 705/8 |
| 6,167,564 A | 12/2000 | Fontana et al. | 717/104 |
| 6,188,403 B1 | 2/2001 | Sacerdoti et al. | 715/764 |
| 6,208,345 B1 | 3/2001 | Sheard et al. | 715/853 |

(Continued)

FOREIGN PATENT DOCUMENTS

EP 1 030 258 8/2000

(Continued)

OTHER PUBLICATIONS

Iterative and incremental development From Wikipedia, the free encyclopedia first posted on Mar. 31, 2005 and downloaded Jan. 24, 2009.*

(Continued)

*Primary Examiner*—Beth V Boswell
*Assistant Examiner*—Mark A Fleischer
(74) *Attorney, Agent, or Firm*—Campbell Stephenson LLP

(57) ABSTRACT

In one embodiment, a method for refining a business process model includes receiving business process data pertaining to a first phase of a business process definition from a first class of users, creating a model of a business process using the business process data received from the first class of users, receiving business process data pertaining to a second phase of the business process definition from a second class of users, and augmenting the model of the business process based on the business process data received from the second class of users. The method further includes iteratively refining the model of the business process in response to input provided by the first class of users and/or the second class of users.

23 Claims, 16 Drawing Sheets

U.S. PATENT DOCUMENTS

| | | | |
|---|---|---|---|
| 6,236,994 B1 | 5/2001 | Swartz et al. | 707/6 |
| 6,256,773 B1 | 7/2001 | Bowman-Amuah | 717/121 |
| 6,275,976 B1 | 8/2001 | Scandura | 717/120 |
| 6,289,380 B1 | 9/2001 | Battat et al. | 709/224 |
| 6,289,382 B1 | 9/2001 | Bowman-Amuah | 709/226 |
| 6,308,161 B1 | 10/2001 | Boden et al. | 705/7 |
| 6,330,007 B1 | 12/2001 | Isreal et al. | 715/762 |
| 6,415,027 B1 | 7/2002 | Malik | 379/221.01 |
| 6,418,450 B2 | 7/2002 | Daudenarde | 707/200 |
| 6,574,635 B2 | 6/2003 | Stauber et al. | 707/103 R |
| 6,601,234 B1 | 7/2003 | Bowman-Amuah | 717/108 |
| 6,647,394 B1 | 11/2003 | Herzberg et al. | 707/102 |
| 6,662,355 B1 | 12/2003 | Caswell et al. | 717/103 |
| 6,738,736 B1 | 5/2004 | Bond | 703/2 |
| 6,820,118 B1 | 11/2004 | Leymann et al. | 709/223 |
| 6,920,474 B2 | 7/2005 | Walsh et al. | 705/7 |
| 6,931,625 B1 | 8/2005 | Coad et al. | 717/109 |
| 6,957,186 B1 * | 10/2005 | Guheen et al. | 705/1 |
| 6,970,844 B1 | 11/2005 | Bierenbaum | 705/39 |
| 6,985,939 B2 | 1/2006 | Fletcher et al. | 709/223 |
| 7,017,162 B2 | 3/2006 | Smith et al. | 719/328 |
| 7,035,944 B2 | 4/2006 | Fletcher et al. | 709/250 |
| 7,047,518 B2 | 5/2006 | Little et al. | 717/108 |
| 7,080,092 B2 | 7/2006 | Upton | 707/102 |
| 7,155,715 B1 * | 12/2006 | Cui et al. | 717/177 |
| 7,184,967 B1 | 2/2007 | Mital et al. | 705/8 |
| 7,236,966 B1 * | 6/2007 | Jackson et al. | 707/1 |
| 7,269,625 B1 | 9/2007 | Willhide et al. | 709/206 |
| 7,290,256 B2 | 10/2007 | Anderson et al. | 717/165 |
| 7,373,358 B2 * | 5/2008 | Ronnewinkel et al. | 707/102 |
| 7,398,512 B2 * | 7/2008 | Martin et al. | 717/105 |
| 7,479,970 B2 * | 1/2009 | Christman et al. | 345/660 |
| 7,487,079 B2 | 2/2009 | Benny et al. | 703/22 |
| 7,562,339 B2 * | 7/2009 | Racca et al. | 717/102 |
| 2002/0016954 A1 | 2/2002 | Charisius et al. | 717/2 |
| 2002/0038335 A1 | 3/2002 | Dong et al. | 709/203 |
| 2002/0038336 A1 | 3/2002 | Abileah et al. | 709/203 |
| 2002/0104071 A1 | 8/2002 | Charisius et al. | 717/109 |
| 2002/0144256 A1 | 10/2002 | Budhiraja et al. | 717/174 |
| 2002/0184070 A1 | 12/2002 | Chen et al. | 705/9 |
| 2002/0184610 A1 | 12/2002 | Chong et al. | 717/109 |
| 2002/0188597 A1 | 12/2002 | Kern et al. | 707/1 |
| 2003/0028651 A1 | 2/2003 | Schreckengast et al. | 709/229 |
| 2003/0084127 A1 | 5/2003 | Budhiraja et al. | 709/220 |
| 2003/0093575 A1 | 5/2003 | Upton | 709/310 |
| 2003/0105884 A1 | 6/2003 | Upton | 709/318 |
| 2003/0105887 A1 | 6/2003 | Cox et al. | 709/328 |
| 2003/0110315 A1 | 6/2003 | Upton | 709/328 |
| 2003/0120539 A1 | 6/2003 | Kourim et al. | 705/11 |
| 2003/0177121 A1 | 9/2003 | Moona et al. | 707/9 |
| 2003/0187707 A1 * | 10/2003 | Hack et al. | 705/7 |
| 2003/0200130 A1 * | 10/2003 | Kall et al. | 705/8 |
| 2003/0217176 A1 | 11/2003 | Beunings | 709/238 |
| 2004/0001092 A1 | 1/2004 | Rothwein et al. | 345/763 |
| 2004/0027388 A1 * | 2/2004 | Berg et al. | 345/781 |
| 2004/0133876 A1 | 7/2004 | Sproule | 717/105 |
| 2004/0162741 A1 * | 8/2004 | Flaxer et al. | 705/7 |
| 2004/0204970 A1 | 10/2004 | Boden et al. | 705/7 |
| 2004/0221238 A1 | 11/2004 | Cifra et al. | 715/762 |
| 2004/0225671 A1 | 11/2004 | Carroll et al. | 707/101 |
| 2005/0044197 A1 | 2/2005 | Lai | 709/223 |
| 2005/0071750 A1 | 3/2005 | Nelson | 715/503 |
| 2005/0114201 A1 | 5/2005 | Walsh et al. | 705/10 |
| 2005/0138031 A1 | 6/2005 | Wefers | 707/9 |
| 2005/0197880 A1 | 9/2005 | Walsh et al. | 705/8 |
| 2005/0223392 A1 | 10/2005 | Cox et al. | 719/328 |
| 2006/0184410 A1 * | 8/2006 | Ramamurthy et al. | 705/8 |
| 2007/0226023 A1 | 9/2007 | Das et al. | 705/7 |
| 2007/0226038 A1 | 9/2007 | Das et al. | 705/10 |

FOREIGN PATENT DOCUMENTS

| | | |
|---|---|---|
| WO | WO 99/05632 | 7/1998 |

OTHER PUBLICATIONS

Internet Archive website showing article posting from Wikipedia download Jan. 24, 2009 from http://web.archive.org/web/*/http://en.wikipedia.org/wiki/Iterative_and_incremental_development.*

Larman, Craig, "Iterative and Incremental Development: A Brief History" Published by the IEEE Computer Society Jun. 2003.*

Owen, Martin and Raj, Jog, "BPMN and Business Process Management Introduction to the New Business Process Modeling Standard," Popkin Software, downloaded from http://www.bpmn.org/Documents/6AD5D1 6960.BPMN_and_BPM.pdf on Jan. 27, 2009.

BPMN-Internet Archive Wayback Machine downloaded from http://web.archive.org/web/*/http://www.bpmn.org/Documents/6AD5D16960.BPMN_and_BPM.pdf on Jan. 27, 2009 at 5:45:36 PM.

Minxin Shen and Duen-Ren Liu, "Coordinating Interorganizational Workflows Based on Process-Views," DEXA 2001, LNCS 2113, pp. 274-283, 2001.

Stonebraker, Michael, "Too Much Middleware," EECS Department M.I.T. SIGMOD Record, vol. 31, No. 1, Mar. 2002.

Exley, Richard Mark et al., U.S. Appl. No. 10/653,028, filed Aug. 28, 2003, entitled "Universal Application Network Architecture."

Ambroszkiewicz, "Web Service Integration as a New Paradigm for Networked Computing," 2002 IEEE.

Chan et al., "Information Integration Platform for CIMS," 2000 IEEE, pp. 743-747.

Bao et al., "Integrating Through User Interface: A Flexible Integration Framework for Third-Party Software," 1996 IEEE, pp. 336-342.

Ponnekanti, Shankar R. and Fox, Armando, "Application-Service Interoperation Without Standardized Service Interfaces," Proceedings of the First IEEE International Conference on Pervasive Computing and Communications, pp. 1-8, 2003 IEEE.

Andreas Homrighausen et al., "Round-Trip Prototyping Based on Integrated Functional and User Interface Requirements Specifications," 7 Requirements Engineering 34 (2002).

James Lin et al., "DENIM: Finding a Tighter Fit Between Tools and Practice for Web Site Design," CHI Letters, vol. 2, iss. 1, p. 510 (Apr. 1-6, 2000).

Hongzheng "Cindy" Lu, "A User Interface Design Requirement Document: What's Wrong With It?," Proc. Human Factors and Ergonomics Society, 295 (2000).

Mark W. Newman & James A. Landay, "Sitemaps, Storyboards, and Specifications: A Sketch of Web Site Design Practice," DIS 2000 (ACM 2000).

Nuno Jardim Nunes & Joao Falcao e Cunha, "Wisdom-Whitewater Interactive System Development with Object Models," in "Object Modeling and User Interface Design," 197 (Mark Van Harmelen, ed., Addison-Wesley Longman 2001).

Nuno J. Nunes & Joao F. Cunha, "Wisdom: A Software Engineering Method for Small Software Development Companies," IEEE Software (Sep./Oct. 2000).

Reinwald, Berthold, et al., *Structured Workflow Management with Lotus Notes Release 4*, Digest of Papers of COMPCON (Computer Society Conference), 1996 Technologies for the Information Superhighway, Santa Clara, Feb. 25-28, 1996, pp. 451-457.

Paul, Santanu, et al., *RainMan: A Workflow System for the Internet*, Proceedings of Usenix Symposium on Internet Technologies and Systems, Dec. 10, 1997, http://www.usenix.org/publications/library/proceedings/usits97/full_papers/paul/paul_html/paul.html.

Lavana, Hemang, et al., *Executable Workflows: A Paradigm for Collaborative Design on the Internet*, Proceedings of the 34th Annual ACM/IEEEConference on Design Automation, Jun. 9, 1999, http://portal.acm.org/citation.cfm?id=266283.

Walters, Garrison, *Essential Guide to Computing: The Story of Information Technology*, Prentice Hall, Aug. 1, 2000, chapters 1-3.

PCT Search Report, PCT/US03/19955, 5 pages, Jan. 20, 2004.

Juan Sanchez Diaz et al., "From User Requirements to User Interfaces: A Methodological Approach," 13th Int. Conf., CAiSE 2001, in 2068 Lecture Notes in Comp. Sci. 60 (K.R. Dittirch, et al. eds., Springer Jun. 4-8, 2001).

Mohammed Elkoutbi et al., "Generating User Interface Prototypes from Scenarios," Proceedings of the 4th IEEE International Symposium on Requirements Engineering, p. 150 (1999).

Mohammed Elkoutbi & Rudolf K. Keller, "User Interface Prototyping Based on UML Scenarios and High-Level Petri Nets," ICATPN 2000, LNCS 1825, p. 166 (M. Nielsen & D. Simpson, eds., Springer 2000).

Andreas Homrighausen et al., "Round-Trip Prototyping for the Validation of Requirements Specifications," REFSQ 2001 (Jun. 2001).

* cited by examiner

PROGRESSIVE REFINEMENT MODEL FOR BUSINESS PROCESSES

REFERENCE TO RELATED APPLICATIONS

This application is related to co-pending U.S. patent application Ser. No. 11/124,519, titled "Providing Multiple Views of a Business Process Definition to Different Users," and U.S. patent application Ser. No. 11/123,746, titled "Modeling of Business Process Data."

FIELD OF THE INVENTION

This invention relates generally to data modeling, and more particularly to modeling of business process data.

COPYRIGHT NOTICE/PERMISSION

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawings hereto: Copyright© 2005, Siebel Systems, Inc., All Rights Reserved.

BACKGROUND OF THE INVENTION

A business process consists of a sequence of steps executed by a human or a system to accomplish a business objective. Examples of business process include Expense Report Approval, Claims Processing, Service Request Resolution, etc. Traditionally, business processes have been an analysis exercise with intent to understand and document current business processes. These business processes were usually documented on paper or at best simulated using a set of assumptions. The business processes were not directly executed and were typically defined by business analysts.

More recently, with the maturity of business process technology, execution of business processes using a business process engine has become possible. Such an execution of business processes has been typically enabled by software developers.

Today, most business process solutions are either targeted at business analysts or software developers. The solutions targeted at business analysts continue to at best result in simulation. This category of tools is usually referred to as Business Process Analysis tools. The solutions targeted at software developers lead to executable processes. However, these solutions typically provide a view that is very IT centric and cannot be modeled or easily understood by business analysts.

A few business process solutions exist that try to address the needs of both the business analysts and software developers. These solutions typically utilize two different tools with two different underlying models. In particular, the skeleton of the executable model is usually generated from the analyst model using one tool, and then the developer completes the executable model using a different tool. This approach of one-way generation makes iterations between business analysts and software developers difficult and does not provide business analysts with execution statistics within the context of their model. In addition, this approach requires translation between the two models, which is inefficient and results in fidelity loss when going from one model to the other.

SUMMARY OF THE INVENTION

The present invention relates to various aspects for refining a business process model.

According to one aspect of the present invention, a method for refining a business process model includes receiving business process data pertaining to a first phase of a business process definition from a first class of users, creating a model of a business process using the business process data received from the first class of users, receiving business process data pertaining to a second phase of the business process definition from a second class of users, and augmenting the model of the business process based on the business process data received from the second class of users. The method further includes iteratively refining the model of the business process in response to input provided by the first class of users and/or the second class of users.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION OF THE INVENTION

Figure 1:
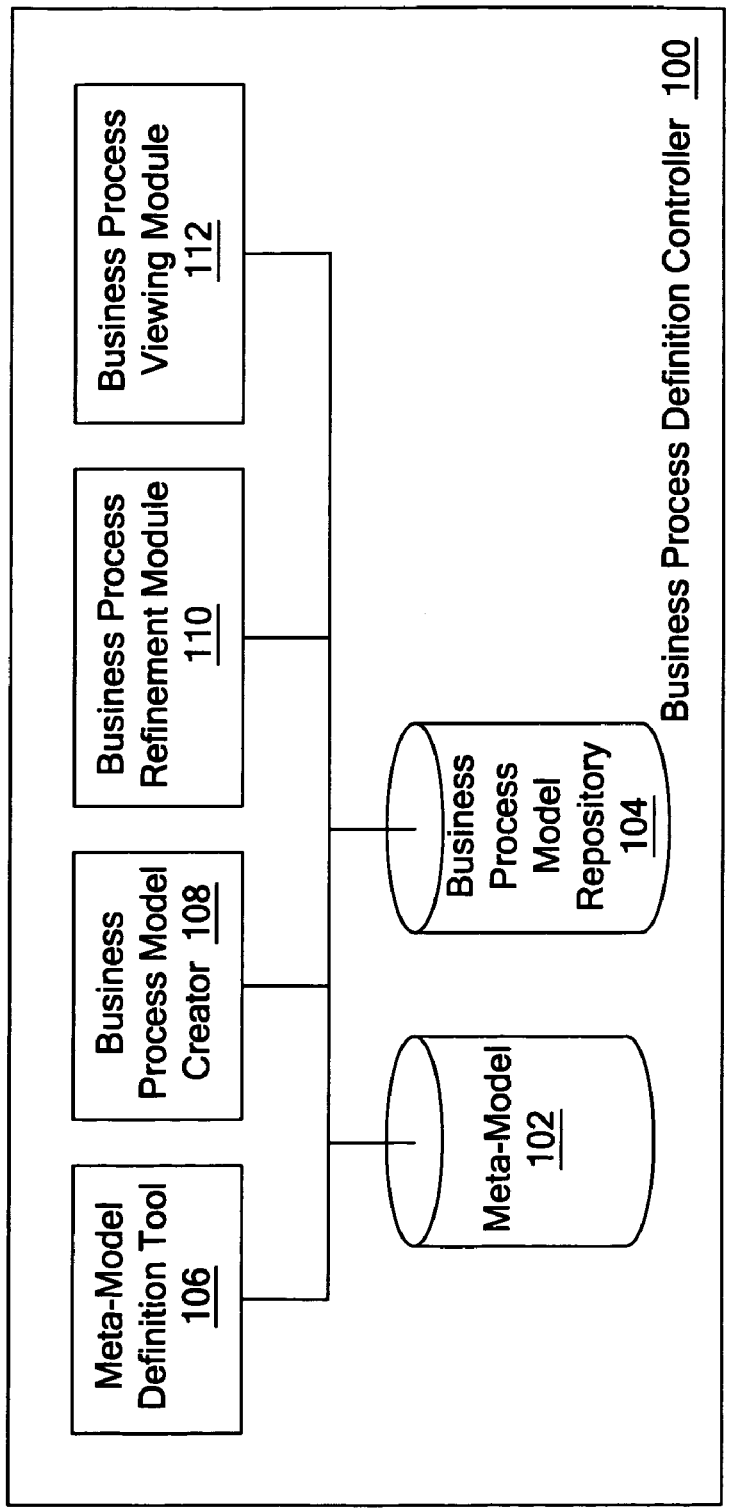
FIG. 1 is a block diagram of one embodiment of a business process definition controller.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

Overview

A business process is a sequence of steps performed by a human or a system to accomplish a business objective. A specified business process is executed by a business process engine. A business process may be represented using a, schema that enables exchange and visualization of business process information. Such a schema is known as a meta-model.

In one embodiment, a business process meta-model is provided that is composed of a set of primitive types (also referred to herein as element types) as building blocks. The element types include control flow elements identifying the control flow of a business process, and annotation elements providing details for the control flow elements. In one embodiment, the control flow elements identify activities within the business process and transitions between the activities. In one embodiment, the annotation elements include operation or action elements, event elements, actor elements and data object elements. The operation elements identify operations associated with the control flow elements, the event elements identify events associated with the control flow elements, the actor elements identify entities responsible for the control flow elements, and the data object elements identify data objects associated with the control flow elements.

In one embodiment, the business process meta-model also includes associations identifying relationships between control flow elements and annotation elements. In one embodiment, an association is a unidirectional reference from a source meta-model element to a target meta-model element. Associations may be used to organize meta-model elements into different usage pattern. An example of a usage pattern may be a definition of an automated service or a definition of a user interface (UI) task. As will be discussed in more detail below, a usage pattern may have different forms based on which associations are applied.

Accordingly, the business process meta-model described herein provides a flexible mechanism for storing and presenting business process data and formulating polymorphic usage pattern, as compared to traditional business process meta-models that typically use usage patterns as building blocks.

A definition of a business process is typically built based on input of different users. For example, a business analyst may specify a flow of activities based on his or her knowledge of the business requirements and a software developer may provide implementation details based on his or her knowledge of implementation requirements.

In one embodiment, a business process definition approach is provided that uses a single business process model to allow a business analyst to specify a business process and then a software developer to make the specified business process executable. This process may be repeated until the resulting business process satisfies the business and runtime requirements for specific industry, platform and deployment. In particular, in one embodiment, a model of a business process is created using specification data received from a business analyst. The model of the business process is then augmented using implementation data received from a software developer. Further, the model of the business process is iteratively refined using input provided by the business analyst and/or software developer. In one embodiment, the business analyst is presented with real execution statistics collected for the business process to assist the business analysis in model refinement.

In one embodiment, other classes of users may participate in refining the business process model. For example, a consultant familiar with requirements of a specific customer may provide customization data to customize the business process model to meet the needs of the specific customer.

Accordingly, a single business process model is used across multiple phases of the business process lifecycle, allowing for progressive refinement of the business process and enabling closed loop between specification, implementation, execution and modified specification of the business process.

In one embodiment, multiple view points of a single business process model are provided to different classes of users. In one embodiment, only details relevant to a particular class of users are exposed to that class of users regardless of the amount of details available in the current definition of the business process. For example, a business analyst can only view details about the specification phase of the business process definition and not be distracted by implementation details.

In one embodiment, a business process model includes a set of model elements and associations defining relationships between the model elements. When a new model element or association is added to the model, it is classified as part of a specific business process definition mode. For example, model elements and associations created in response to input of a business analyst may be classified as part of the specification mode, and model elements and associations created in response to input of a software developer may be classified as part of the implementation mode. Subsequently, when a business analyst requests to view the business process model, only model elements and associations classified as part of the specification mode are selected for the viewpoint to be provided to the business analyst. In addition, in one embodiment, the selected model elements and associations are further evaluated with respect to applicable accessibility rules. If the applicable accessibility rules allow access of the business analyst to a selected model element or association, then this model element or association is included in the viewpoint presented to the business analyst.

Accordingly, multiple view points are provided to allow different classes of users to participate in different phases of business process definition and not be distracted by irrelevant details.

FIG. 1 is a block diagram of a business process definition controller 100. In one embodiment, the business process definition controller 100 resides on a server communicating with client devices of various users (e.g., business analysts, software developers, etc.) via a network (e.g., Internet or local area network (LAN)). The business process definition controller 100 includes a meta-model definition tool 106, a business process model creator 108, a business process refinement module 110, and a business process viewing module 112.

The meta-model definition tool 106 (e.g., an XML schema definition tool or UML modeling tool) is responsible for creating a meta-model 102 (e.g., in an XML schema file or UML file). In one embodiment, the meta-model 102 is composed of a set of elements (referred to as primitives) and associations identifying relationships between the primitives. The meta-model definition tool 106 can assemble the primitives into different usage patterns using corresponding associations.

The business process model creator 108 is responsible for receiving business process data from various users, creating objects for the business process data based on the meta-model 102, and composing objects into models of specific business processes. The business process models are stored in a repository 104.

The business process refinement module 110 is responsible for augmenting the business process models based on input received from various users. In one embodiment, the business process refinement module 110 is also responsible for maintaining traceability between the work of different classes of users (e.g., business analysts and software developers) and for providing execution statistics to different classes of users to assist them in the refinement of business process models.

The business process viewing module 112 is responsible for providing multiple view points of individual business process models to different classes of users. In particular, only details relevant to a particular class of users are exposed to that class of users regardless of the amount of details available in the current definition of the business process. In one embodiment, the business process viewing module 112 creates a view point for a specific user by selecting model primitives and associations that were created in response to input of that user and are allowed to be accessed by that user in view of applicable accessibility rules, as will be discussed in more detail below.

Business Process Meta-Model

In one embodiment, a meta-model is defined that represents a business process and is composed of a set of primitive types (also referred to herein as element types) as building blocks. The primitive types include control flow primitives and annotation primitives. The control flow primitives identify activities within the business process and transitions between the activities. In one embodiment, in a graph representation of the meta-model, the control flow primitives are vertexes and arcs. A vertex may represent an activity or a gateway (e.g., a branch, a fork, a join, etc.). An arc may represent a transition between the activities.

The annotation primitives provide details pertaining to the control flow primitives. In one embodiment, the annotation primitives include operation or action primitives, event primitives, actor primitives and data object primitives. In an alternative embodiment, the operation primitives are not part of the annotation primitives, but rather an independent type of primitives referred to as action primitives.

The operation primitives identify operations associated with the control flow primitives (activities and gateways). In particular, an operation primitive contains information that specifies how an activity should be executed. Examples of operations include a service invocation, a task invocation, a message reply, etc. In a graph, an operation primitive may be attached to an activity or gateway to indicate when the operation is to be performed in the overall control flow.

The event primitives identify events associated with the control flow elements. For example, an event primitive may specify an event that triggers the activity or defines the duration of the activity.

The actor primitives identify entities responsible for the control flow elements. For example, an actor primitive may specify a user responsible for the activity or participating in the activity. Alternatively, an actor primitive may specify that the activity is performed by a system.

The data object primitives identify data objects associated with the control flow elements. For example, a data object primitive may specify a data structure for an input or output of the activity.

Figure 2:
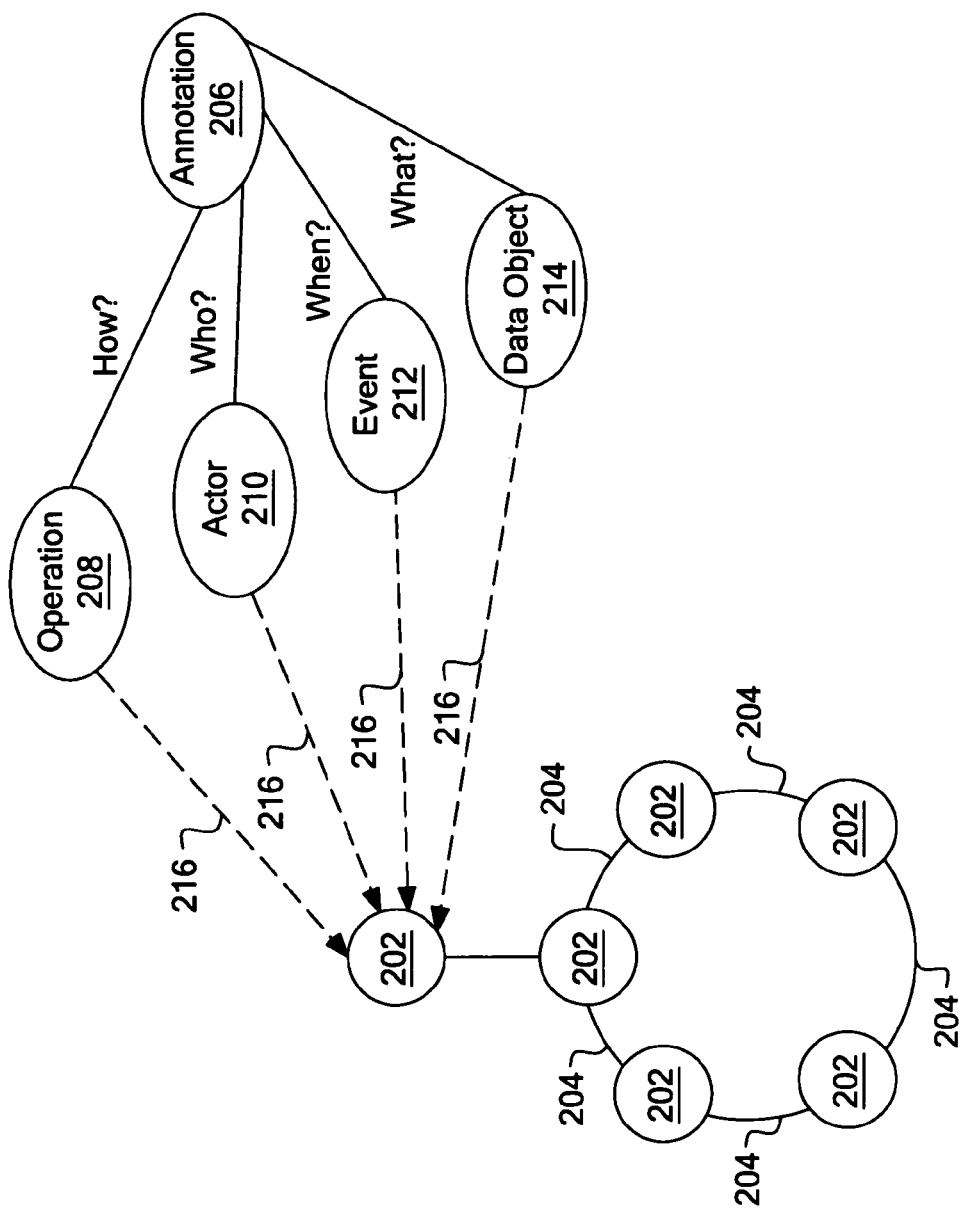
FIG. 2 illustrates an exemplary representation of a business process meta-model.

FIG. 2 illustrates an exemplary representation of a business process meta-model. As shown in FIG. 2, the business process meta-model is presented as a graph having vertexes 202 and arcs 204. Vertexes 202 and arcs 204 represent control flow primitives. A vertex 202 is the base type for activities and gateways. An arc 204 is the base type for transition.

Annotation primitives 206 are of four types: operation primitives 208, actor primitives 210, event primitives 212 and data object primitives 214.

In one embodiment, the business process meta-model also includes associations 216 identifying relationships between control flow primitives 202 and annotation primitives 206. In one embodiment, an association 216 is a unidirectional reference from a source primitive to a target primitive. In one embodiment, an association 216 is classified by the association type that is identified by the usage type code, source primitive type and target primitive type. The usage type code is an enumerated value that indicates how the target primitive utilizes the source primitive or vice versa.

Primitives and associations may be composed into different usage patterns. In one embodiment, different usage patterns may be created from the same set of primitives based on which associations are applied.

Figure 3:
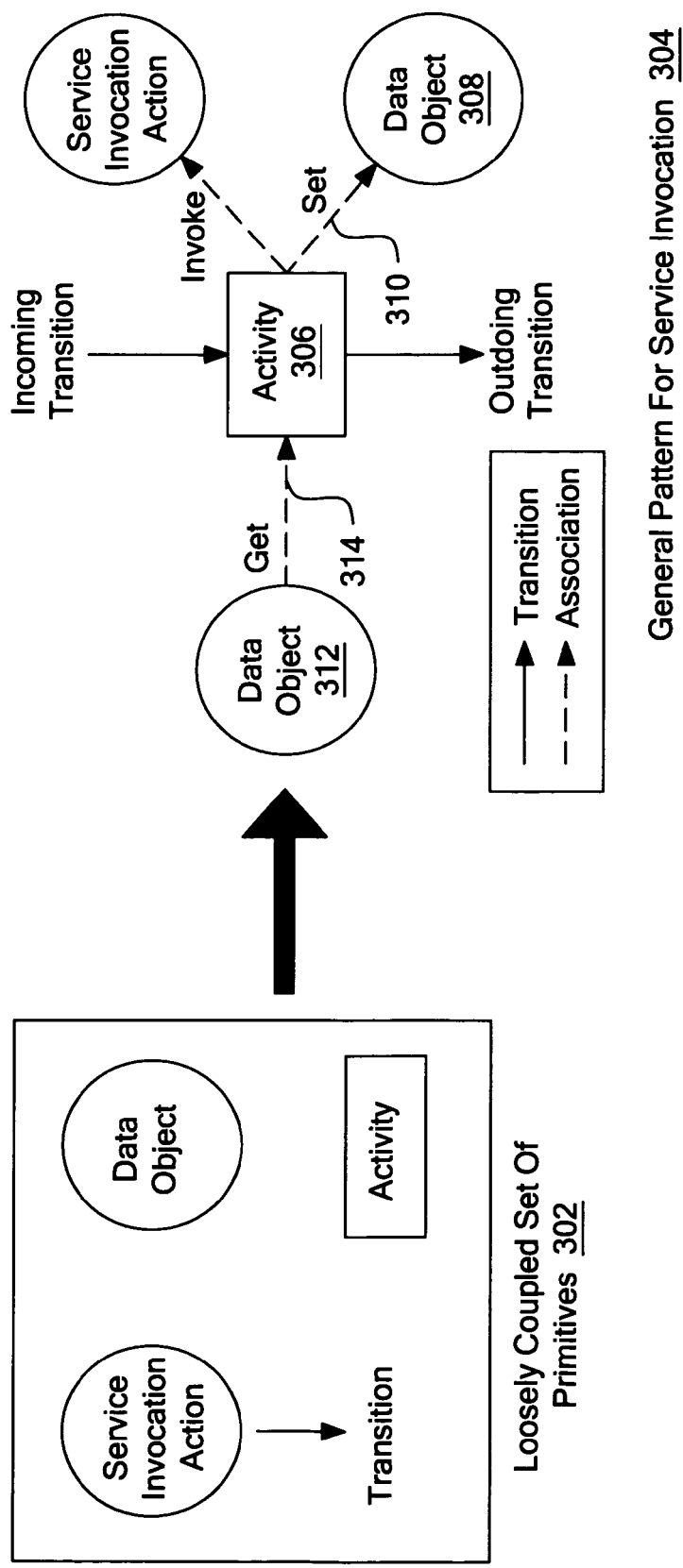
FIG. 3 is a block diagram illustrating a formulation of a usage pattern.

FIG. 3 illustrates formulation of a general usage pattern 304 for service invocation from a loosely coupled set of primitives 302. The usage pattern 304 includes an activity primitive 306 and data object primitives 312 and 308. An association 314 indicates that the data object 312 is the input data structure for the activity 306. An association 310 indicates that the data object 308 is the output data structure of the activity 306. If instead of the association 310 we use an association with usage type "get" and data object 308 as source primitive and activity 306 as target primitive, then this new association would indicate that the data object 308 is another input data structure for the activity 306, in addition to the data object 312, thus resulting in a different usage pattern for service invocation.

Figure 4:
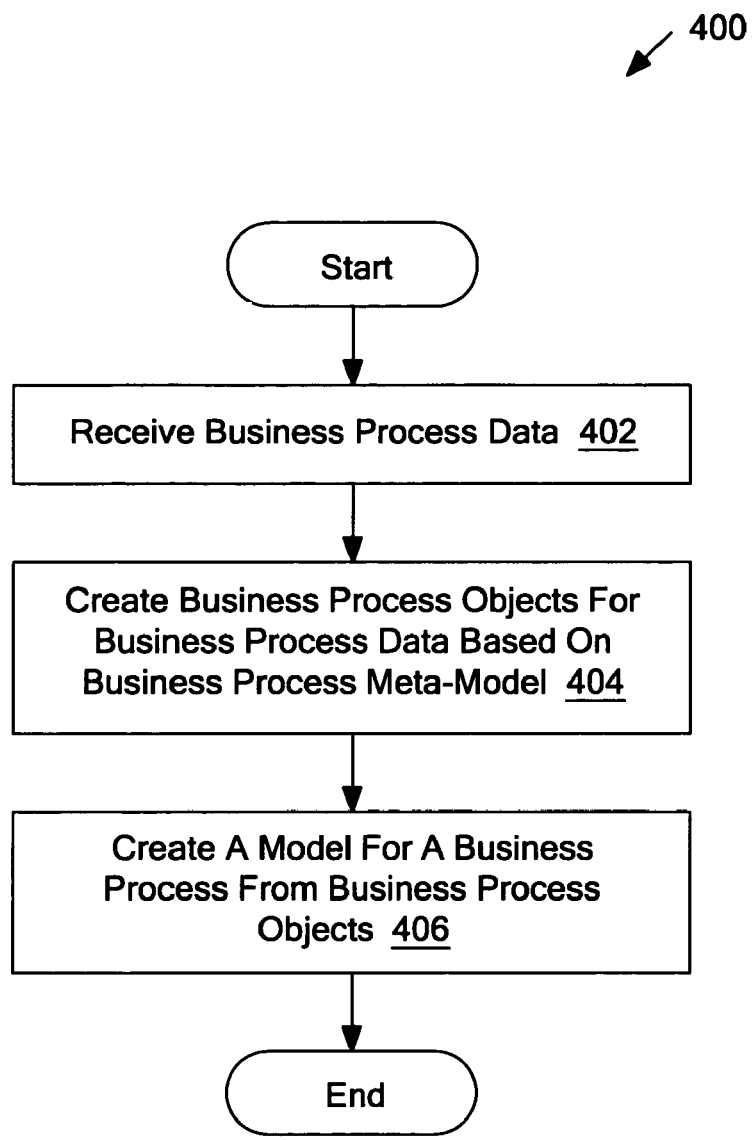
FIG. 4 is a flow diagram of one embodiment of a process for creating a business process model.

FIG. 4 is a flow diagram of one embodiment of a process 400 for creating a business process model. The process may be performed by processing logic that may comprise hardware (e.g., circuitry, dedicated logic, etc.), software (such as run on a general purpose computer system or a dedicated machine), or a combination of both. Processing logic may reside in the business process definition controller 100 of FIG. 1.

Referring to FIG. 4, process 400 begins with processing logic receiving business process data from a user (processing block 402). In one embodiment, the user is provided with a user interface that displays various business process data categories and lists possible options for each of the displayed categories to assist the user in inputting the desired business process data. The displayed categories of the business process data may be selected based on the business process meta-model. As discussed above, the business process meta-model is composed of control flow primitives such as activities and transitions, and annotation primitives such as operations, events, actors and data objects. Accordingly, the displayed categories may include activities to be performed in a business process, transitions between the activities, operations to be performed to accomplish the activities, events triggering the activities, entities responsible for the activities, and data objects to be used during the activities. In one embodiment, the user interface may present for user selection various usage patterns formulated from sub-sets of meta-model primitives and associations. In one embodiment, the user is allowed to modify an existing usage pattern (e.g., by removing some primitives or changing associations).

At processing block 404, processing logic creates business process objects for the business process data based on the business process meta-model. A business process object is an instance of a primitive type or an association type within the business process meta-model. In one embodiment, processing logic creates business process objects for primitives and associations from a usage pattern selected by the user.

At processing block 406, processing logic creates the business process model from the business process objects and stores this model in a business process model repository.

Progressive Refinement of Business Process Definition

A definition of a business process is typically built based on input of different users. In one embodiment, a business process definition approach is provided that uses a single business process model to allow different classes of users to participate in the definition of a business process and iteratively refine the business process definition until it satisfies the business and runtime requirements for specific industry, platform and deployment.

Figure 5:
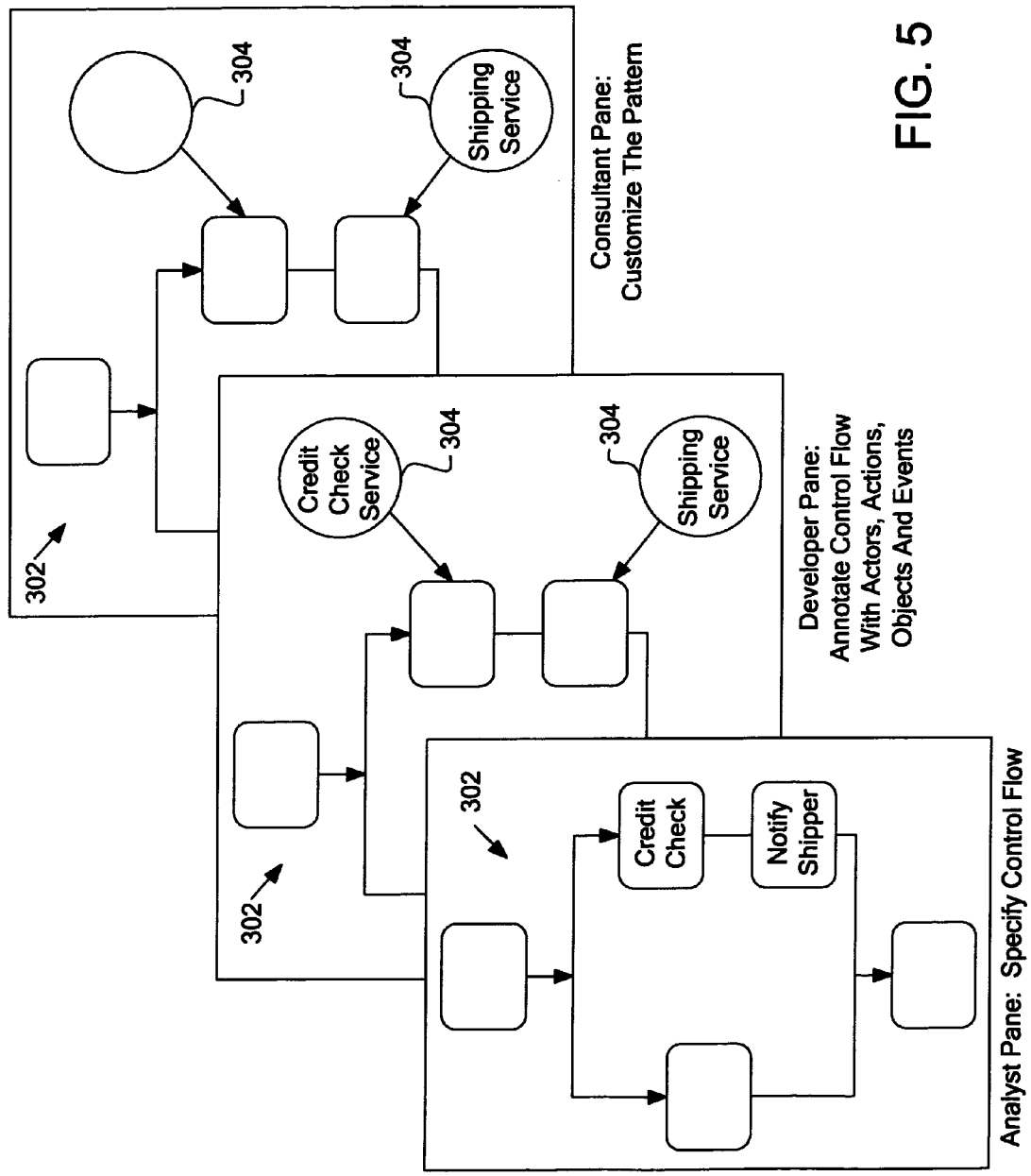
FIG. 5 illustrates an exemplary process for building a business process definition based on input of different classes of users.

FIG. 5 illustrates an exemplary process for building a business process definition based on input of different classes of users. Different classes of users may include, for example, business analysts, software developers and consultants familiar with requirements of particular customers. A business analyst specifies a flow of activities 302, given his or her knowledge of the business requirements. A software developer then adds details 304 for each activity in the flow, given the developer's knowledge of general implementation requirements. A consultant further modifies the details 304 or control flow 302 based on his or her understanding of the customization requirements. These phases can go through multiple iterations, allowing the users to improve the business process definition and providing closed loop between specification, implementation, and execution of the business process.

Figure 6:
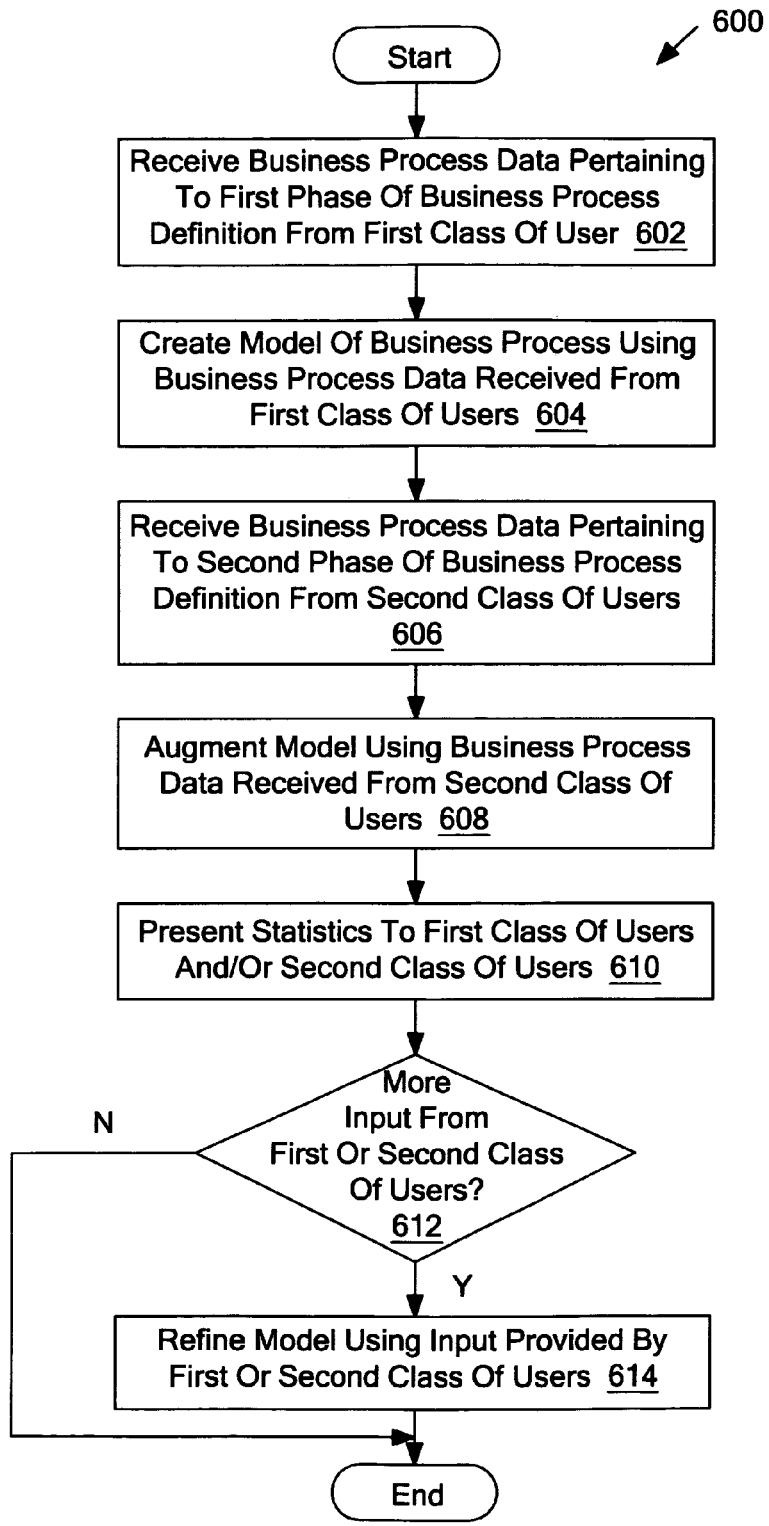
FIG. 6 is a flow diagram of a process for progressively refining a business process model.

FIG. 6 is a flow diagram of one embodiment of a process 600 for progressively refining a business process definition. The process may be performed by processing logic that may comprise hardware (e.g., circuitry, dedicated logic, etc.), software (such as run on a general purpose computer system or a dedicated machine), or a combination of both. Processing logic may reside in the business process definition controller 100 of FIG. 1.

Referring to FIG. 6, process 600 begins with receiving business process data pertaining to a first phase of a business process definition from a first class of users (processing block 602). In one embodiment, the first class of users represents business analysts, the first phase of the business process definition is the specification of the business process, and the business process data specifies the control flow for the business process.

At processing block 604, processing logic creates a model of the business process using the business process data received from the first class of users. In one embodiment, the model is created based on the business process meta-model composed of a set of primitives and associations identifying relationships between the primitives. In one embodiment, processing logic classifies each primitive and association created during the first phase as part of the first phase mode (e.g., specification mode) and records these classifications to trace the work of the first class of users.

At processing block 606, processing logic receives business process data pertaining to a second phase of the business process definition from a second class of users. In one embodiment, the second class of users represents software developers, the second phase of the business process definition is implementation of the business process, and the business process data provides details for the activities in the control flow of the business process. In one embodiment, users from the second class provide different business process data for the business process model based on different targets of the second phase. For example, an IT environment may have multiple business process engines for executing business process definitions (e.g., some business process engines may be included as part of applications while others may be included in middleware software). The software developers may then provide different semantics for the business process model based on different target business process engines.

At processing block 608, processing logic augments the model of the business process using the business process data received from the second class of users. In one embodiment, processing logic classifies each primitive and association created during the second phase as part of the second phase mode (e.g., implementation mode) and records these classifications to trace the work of the second class of users. As discussed above, in one embodiment, the second phase may receive business process data for multiple targets (e.g., multiple business process engines). In this embodiment, processing logic augments the model of the business process using the business process data received for multiple targets. In addition, processing logic classifies each primitive and association created during the second phase as part of the second phase mode (e.g., implementation mode) and a specific target. Processing logic then records these classifications to trace the work of the second class of users with respect to different targets.

In one embodiment, other classes of users may participate in the augmentation of the business process model. For example, a consultant familiar with requirements of a specific customer may provide customization data to customize the business process model to the needs of the specific customer. Processing logic then augments the model of the business process based on the customization data and classifies each primitive and association created during the customization phase as part of the customization mode. Processing logic records these classifications to trace the work of the consultant.

Further, processing logic collects execution statistics during the execution of the business process. The execution statistics provides performance details pertaining to the elements of the business process model. For example, the execution statistics may specify how many times an activity or a branch from the control flow was executed, the duration of the activity execution, the size of input and output files of the activities, etc.

At processing block 610, processing logic presents statistics pertaining to a specific phase of the business process definition to a corresponding class of users. The statistics is presented in the context of the model defined by the corresponding class of users. For example, the statistics may be presented to the business analyst as charts and graphs for the activities and branches defined by the business analyst. In another example, the statistics may be presented to the software developer for each data object specified by the software developer. In addition, each software developer may be presented with statistics associated with a specific business process engine.

At processing block 612, processing logic determines whether any input is received from the corresponding class of users in response to the presented statistics. If so, processing logic refines the business process model based on the input received from the corresponding class of users (processing block 614). In one embodiment, processing logic records the classification of each primitive and association added or modified by the corresponding class of users to maintain traceability between the work of different classes of users. In one embodiment, processing logic also records a specific target for which primitives and associations were created to maintain traceability between the work pertaining to different targets.

Further, processing logic repeats processing blocks 612 and 614 until no more input is received from any users. In one embodiment, processing logic creates different usage patterns for different phases of refinement from the same subset of primitives using different associations. For example, an operation associated with an activity in the implementation mode may not be part of the usage pattern in the specification mode because there is no association between this activity and the operation in the specification mode.

In one embodiment, processing logic prevents users of a specific class from removing or modifying primitives and associations created by any other class of users while allowing the users of the specific class to remove and modify primitives and associations created by the users of this specific class. In one embodiment, processing logic may prevent a user from removing or modifying primitives and associations created by another user from the same class depending on the target for which these primitives and associations were created.

Providing Multiple View Points to Different Users

In one embodiment, multiple view points of a single business process model are provided to different classes of users. Each class of users sees a view of the business process that is relevant to them. A view point continues to be valid and available to a corresponding class of users even after the business process model has been modified in response to input received from other users. For example, a business analyst can view the business analyst view of the business process even after a software developer has added implementation details of the business process. In one embodiment, only details relevant to a particular class of users are exposed to that class of users regardless of the amount of details available in the current definition of the business process. For example, a business analyst can only view details about the specification phase of the business process definition and not be distracted by implementation details.

In one embodiment, a business process model includes a set of primitives and associations defining relationships between the primitives. In one embodiment, the primitives and associations are logically partitioned according to the mode at which they are created. Each logical partition is referred to herein as a pane. If a primitive or association is created in the specification mode, then the primitive or association is classified as part of the specification pane. Similarly, a primitive or association is classified as part of the implementation pane, if it is created in the implementation mode.

In one embodiment, each primitive may have one or more properties. Optionally, a property can be declared to be classifiable. A classifiable property is multi-valued property such that each value can be partitioned into the specification pane or implementation pane. If a property is not explicitly labeled to be classifiable, then the property has a single value, which is shared across the panes.

In one embodiment, accessibility rules are used to provide access control on the types and objects in the meta-model to different modes thus controlling what is seen as well as what can be modified in a particular mode. In one embodiment, each accessibility rule controls four types of permissions: display, create, modify and delete. In one embodiment, the accessibility rules include a type accessibility rule used for granting the access permission of a primitive type to a pane, an overlay accessibility rule used for granting access permission of an object across multiple panes, and a scoping rule used for granting access permission of a primitive to a parent context. An object is an instance of a primitive type or association type. The type accessibility rules specify the access permissions granted to the panes for each primitive type. By default, all the panes may have all the permissions for all the primitive types. The type accessibility rule is used to limit the availability of the primitive type in a particular pane. For example, the type accessibility rule can be used to prohibit a transformation action to be used in the specification pane, given that transformation is an implementation detail. The type accessibility rule can also be used to control accessibility of an individual property within a primitive type. The type accessibility rule may also implicitly impact how the association type is controlled. If the pane has the display permission on both the source primitive type and target primitive type, then the pane can display, create, modify and delete the association.

By default, a user in a particular designer mode has access permissions to the objects (primitives and associations) in the corresponding pane. The overlay rules allow objects to be shared in other panes, by defining the permissions granted from one pane to another, based on the dependency of the two panes. It is called the overlay rule since the rule creates an effect on overlaying the objects from one pane onto another. In one embodiment, the overlay rule is divided into three parts: dependency between panes, sharing of objects, and accessibility across panes. For example, with respect to dependency between panes, the overlay rule may state that pane A has limited access to the objects in pane B, where pane A depends on Pane B. The overlay rule may then also state that the dependency of the panes in the meta-model should be ordered linearly. In other words, each pane can only have one dependency, and each pane can only have one other pane being depending on it. In addition, the effects of pane dependencies may be cumulative. Thus, Pane A can have access to the objects in its Pane B, plus any objects that Pane B itself depends on. In addition, the implementation pane is dependent on the specification pane by default. This implies that if a primitive is created for the specification phase, this primitive should be taken into account in the implementation phase.

With respect to sharing of objects, once the dependency of the panes is determined, it is possible to control whether objects of a certain type are eligible for sharing. By default, an object is available to any pane that is dependent on it. Explicit constraint can be specified to restrict sharing for a primitive type or association type:

no sharing: a pane can declare to exclude overlaying objects of a certain primitive type or association type from its dependency. The constraint is applied recursively to any pane in the dependency hierarchy.

Override: a pane can declare to overlay objects of a certain type from its dependency, only if the pane does not contain an instance of the same type. If the pane contains an instance of such type, this constraint will restrict any instance to be overlaid from the dependency panes. The constraint is applied recursively to any pane in the dependency hierarchy.

With respect to accessibility across panes, for the objects that are eligible for sharing, a set of predefined access behaviors restricts the accessibility of these shared objects to other panes. The predefined access behaviors are inherent to the meta-model and they are not customizable. The following access permissions describe sharing objects between the specification pane and the implementation pane:

a. display permission: the implementation pane has the display permission of specification objects as long as the type accessibility rule is not violated.

b. create permission: the rule does not apply to the create permission. The create permission is governed by type accessibility rule.

c. modify permission: the implementation pane has the modify permission of specification objects as long as the type accessibility rule is not violated.

d. delete permission: the implementation pane cannot physically delete an object in the specification pane. The specification object can be marked as "hidden" in the implementation pane. Thus, in effect, it can visually remove the objects in the business analyst view.

Control flow primitives, such as vertexes and arcs, may be overlaid just like any other annotative primitives. For the annotative primitives, the overlay rule simply accumulates primitives from multiple panes into the same pattern. Control flow primitives, on the other hand, are sequenced in a graph. The placement of a vertex with respect to other vertexes is important. When the control flow primitives are overlaid, it does not necessarily yield a well-formed graph, if modifications are made in both panes at the same location in the graph. Any such conflict will need to be resolved after the panes are overlaid. In one embodiment, groups are used to avoid conflicts across panes. A group is a collection of steps added in one view that can be hidden in another view. For example, a software developer may use a group to add multiple steps for a single step in the business analyst view, and the steps from the group will not be seen in the business analyst view. By partitioning process steps into groups and granting accessibility to steps in a group based on the user role, different classes of users can modify different portions of the business process definition. This avoids two classes of users modifying the same step within the business process definition.

The scoping rule may be used to control the visibility of an object to some other group. By default, an annotative primitive is visible to any group within a process definition. A constraint can be applied to a primitive type to restrict the visibility of this primitive type to another group. The constraints may be local and hierarchical. A local constraint allows a primitive defined in group A to be visible only in group A. A hierarchical constraint allows a primitive defined in group A to be visible in any sub-group of A.

During different phases of discovery and implementation, behavior of business process steps gets more concrete. For example, a business analyst may not care whether a business process step is executed as an automated service or is performed by a human. In one embodiment, as the business process is being refined, the type of the step can be added or modified. This is enabled by the meta-model which stores the type information for a step as an association to the primitive vertex, as discussed in more detail above.

Figure 7:
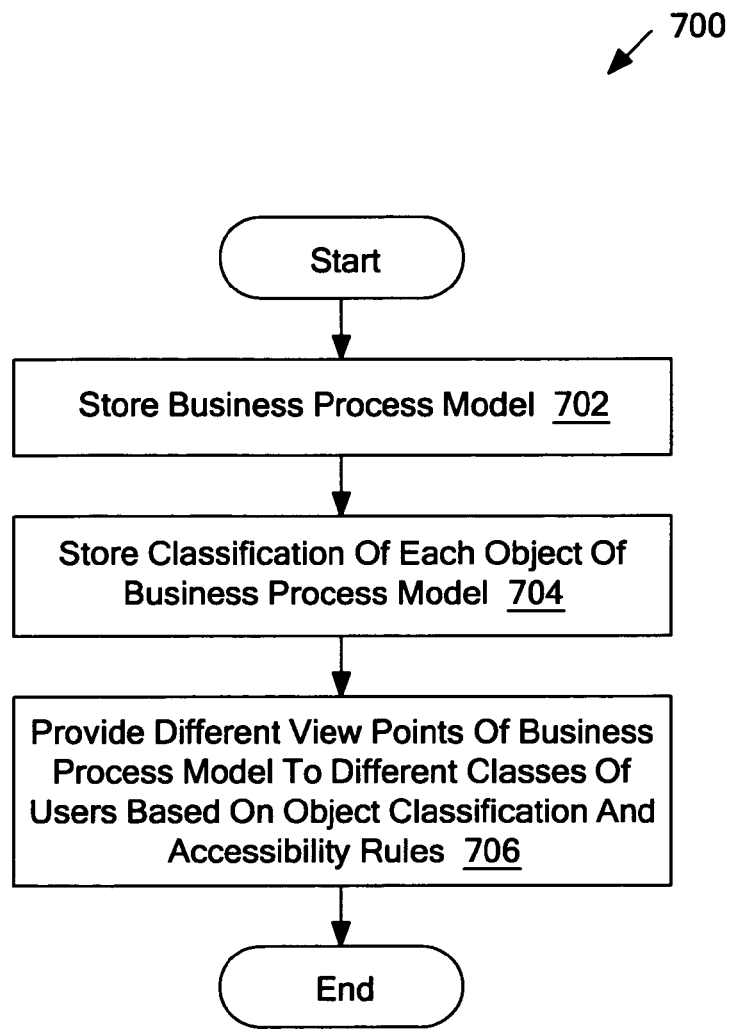
FIGS. 7 and 8 are flow diagrams of some embodiments of a process for proving multiple view points to different classes of users.
Figure 8:
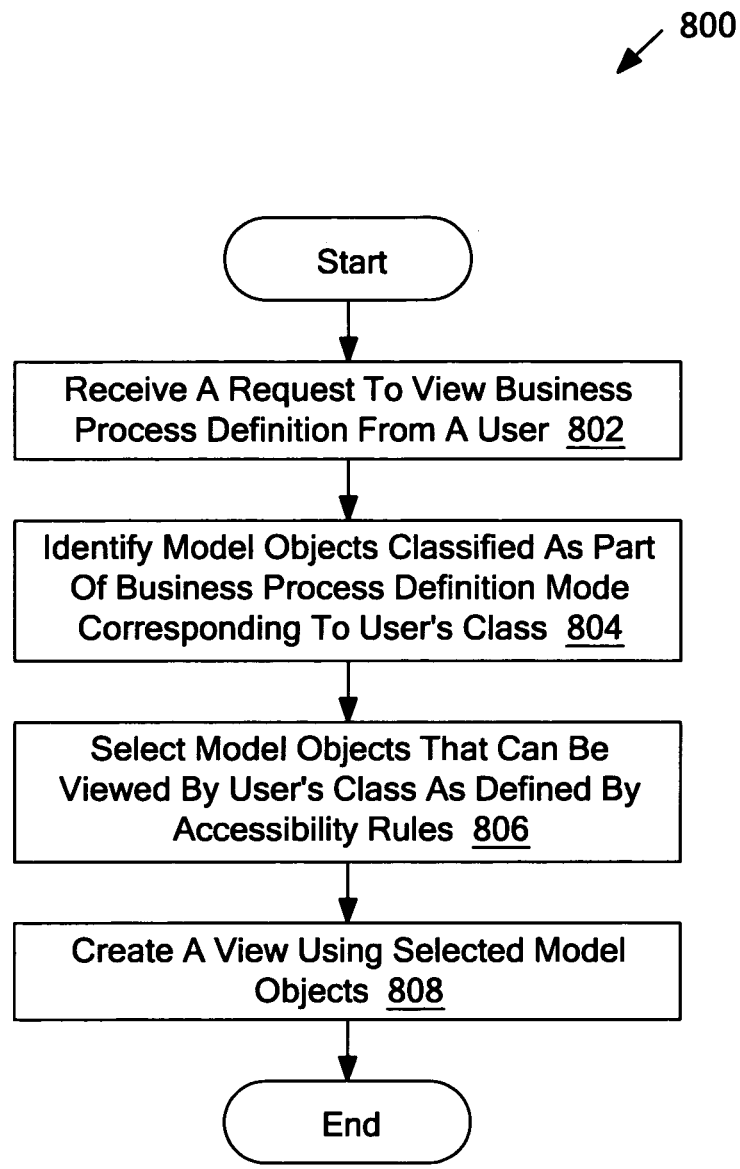

FIGS. 7 and 8 are flow diagrams of some embodiments of a process for proving multiple view points to different classes of users. The process may be performed by processing logic that may comprise hardware (e.g., circuitry, dedicated logic, etc.), software (such as run on a general purpose computer system or a dedicated machine), or a combination of both. Processing logic may reside in the business process definition controller 100 of FIG. 1.

Referring to FIG. 7, process 700 begins with storing a business process model (processing block 702). In one embodiment, the business process model is created and modified using the meta-model as discussed in greater detail above.

At processing block 704, processing logic stores a classification of each object of the business process model. In one embodiment, the classification indicates a pane or a mode (e.g., specification mode or implementation mode) in which a corresponding object was created or modified. In one embodiment, the classification also indicates a target (e.g., a target business process engine) for which a corresponding object was created or modified. In one embodiment, processing logic stores a classification for each group of objects (e.g., a collection of steps added in a specific mode).

At processing block 706, processing logic provides different view points of the business process model to different classes of users based on object classifications and relevant accessibility rules, as will be discussed in more detail below in conjunction with FIG. 8. processing logic may also provide different view points of the business process model to different users from the same class based on different targets.

Referring to FIG. 8, process 800 begins with receiving a request to view a business process definition from a user (processing block 802). The user may be, for example, a business analyst or a software developer.

At processing block 804, processing logic identifies objects of the business process model that are classified as part of the pane or mode corresponding to the user's class. For example, if the user is a business analyst, processing logic identifies objects classified as part of the specification mode. Similarly, if the user is a software developer, processing logic identifies objects classified as part of the implementation mode.

At processing block 806, processing logic applies accessibility rules to the identified objects and selects the objects that can be viewed by the user's class as defined by the accessibility rules. In one embodiment, processing logic first applies a type accessibility rule to each identified object to determine whether the object's type can be viewed by the user's class. If this determination is positive, then processing logic applies an overlay rule to this object to determine whether this object can be viewed by the user's class. If so, processing logic selects this object. If not, processing logic determines that this object cannot be viewed by the user.

At processing block 808, processing logic creates a view for the user using the selected objects.

As discussed above, in one embodiment, different views are provided to different users from the same class. Each view corresponds to a distinct target such as a distinct target business process engine (distinct execution target). In one embodiment, views of a business process model are divided into a logical view and one or more physical views. The logical view of the process includes the intent aspect which is independent of the execution target. The physical view of the process includes all the target specific details and is ready to be executed in the target engine. Primitives and annotations that are independent of the target engine are enabled in the logical view of the process. Target engine specific semantics are enabled as annotations specific to the Physical view and associated to the logical primitives and annotations. Then, target engine specific views can be provided by enabling or disabling physical annotations and associations, as described above. As a result, the business process intent (logical view) can be defined once and then targeted to multiple execution engines. Any edits in the logical view of the process always percolates to all the engine specific definitions.

FIGS. 9-15 are exemplary user interfaces illustrating one embodiment of a process for providing multiple views of the business process model. One skilled in the art will appreciate that various other user interfaces can be used to present multiple views to different users without loss of generality.

Figure 9:
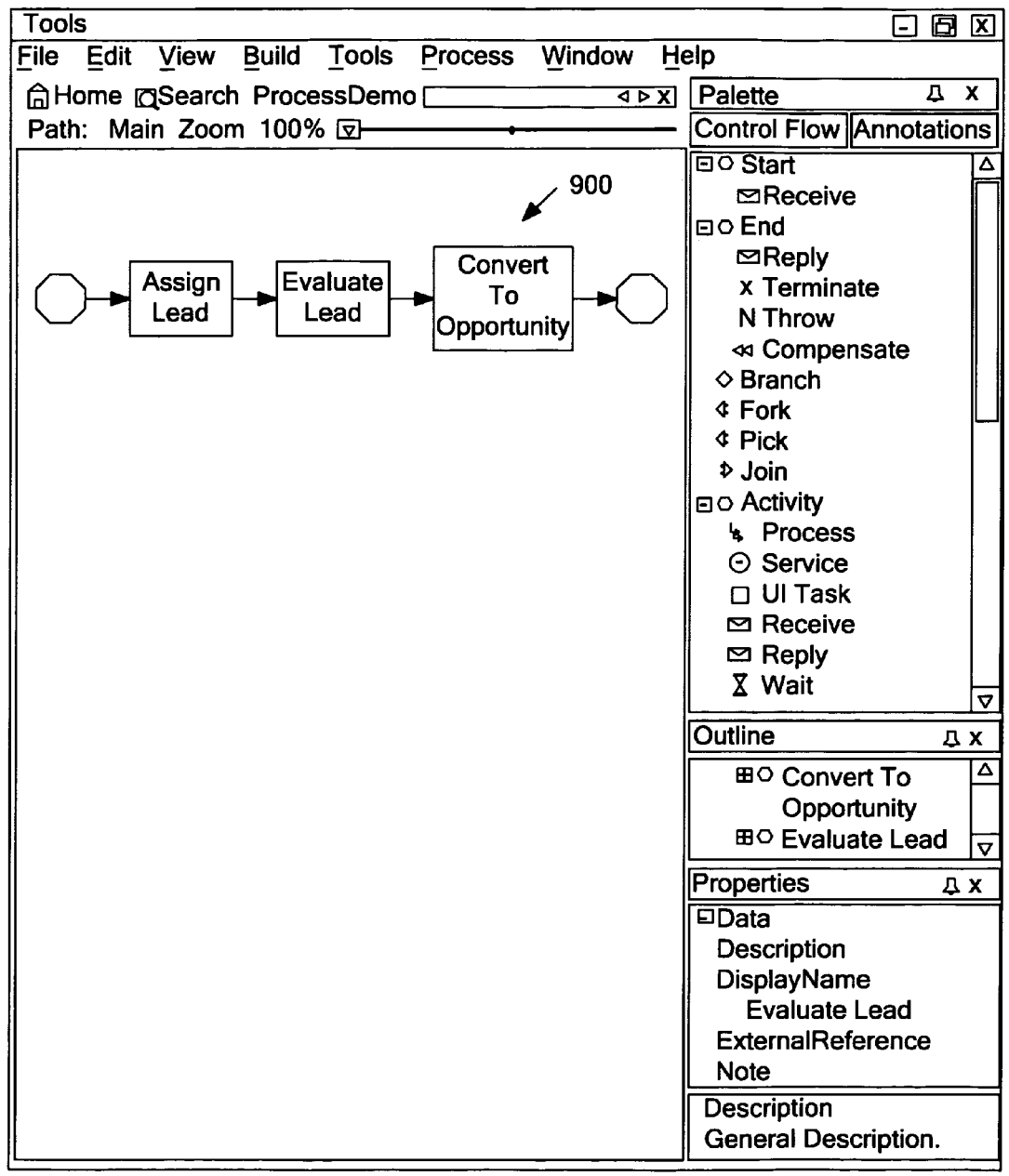
FIGS. 9-15 are exemplary user interfaces illustrating one embodiment of a process for providing multiple views of the business process model.

FIG. 9 illustrates a control flow 900 specified by a business analyst for the Lead-To-Opportunity business process. The control flow includes three high level activities: Assign Lead, Evaluate Lead, and Convert to Opportunity.

Figure 10:
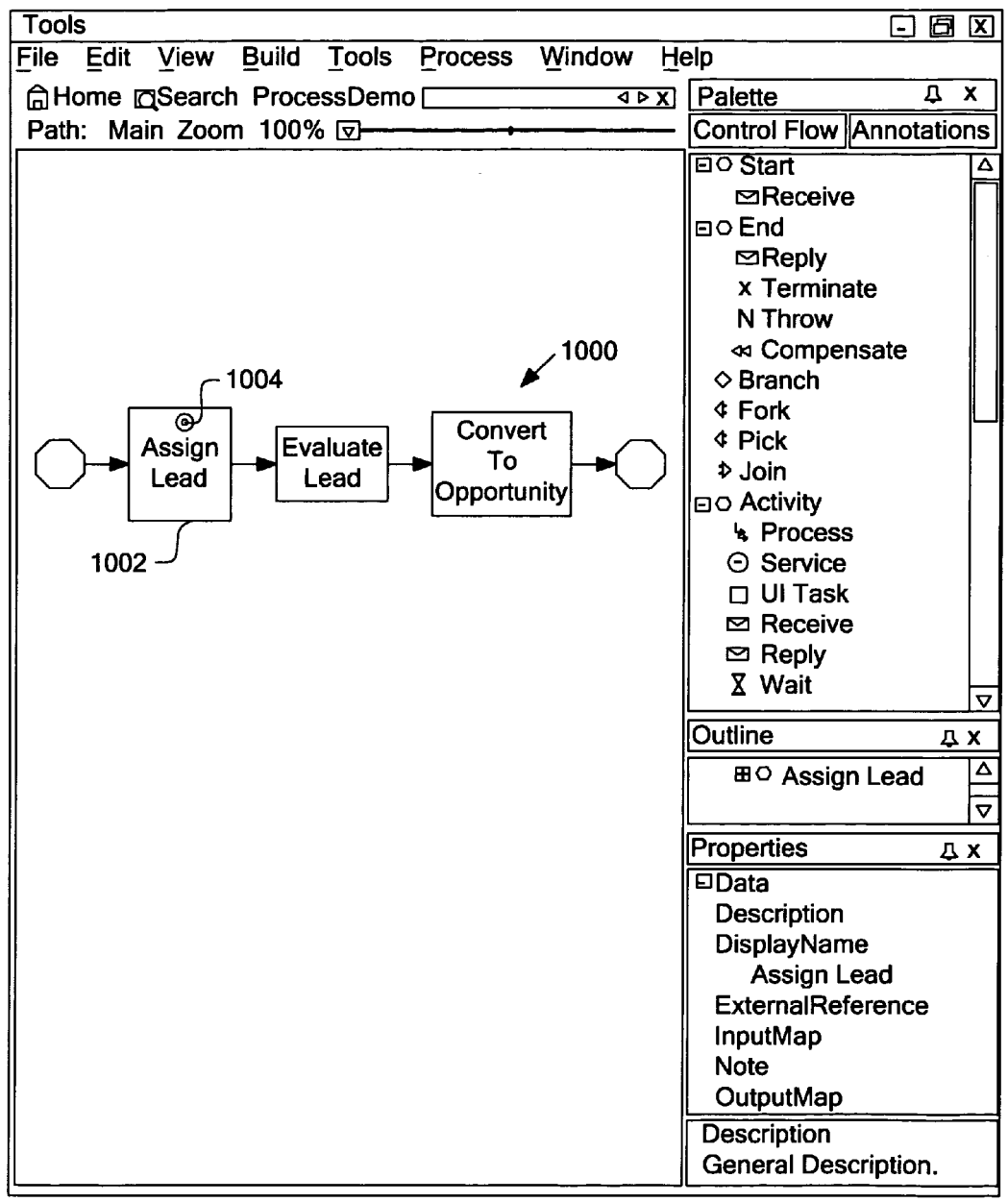

Referring to FIG. 10, the business analyst identifies activities in the control flow 1000 that are to be performed by humans, automated by systems, etc. In the illustrated example, activity 1002 has been identified as a service (i.e., an activity that is automated by a system). This identification is denoted by the addition of the gear icon 1004 on the rectangular box for the activity 1002.

Figure 11:
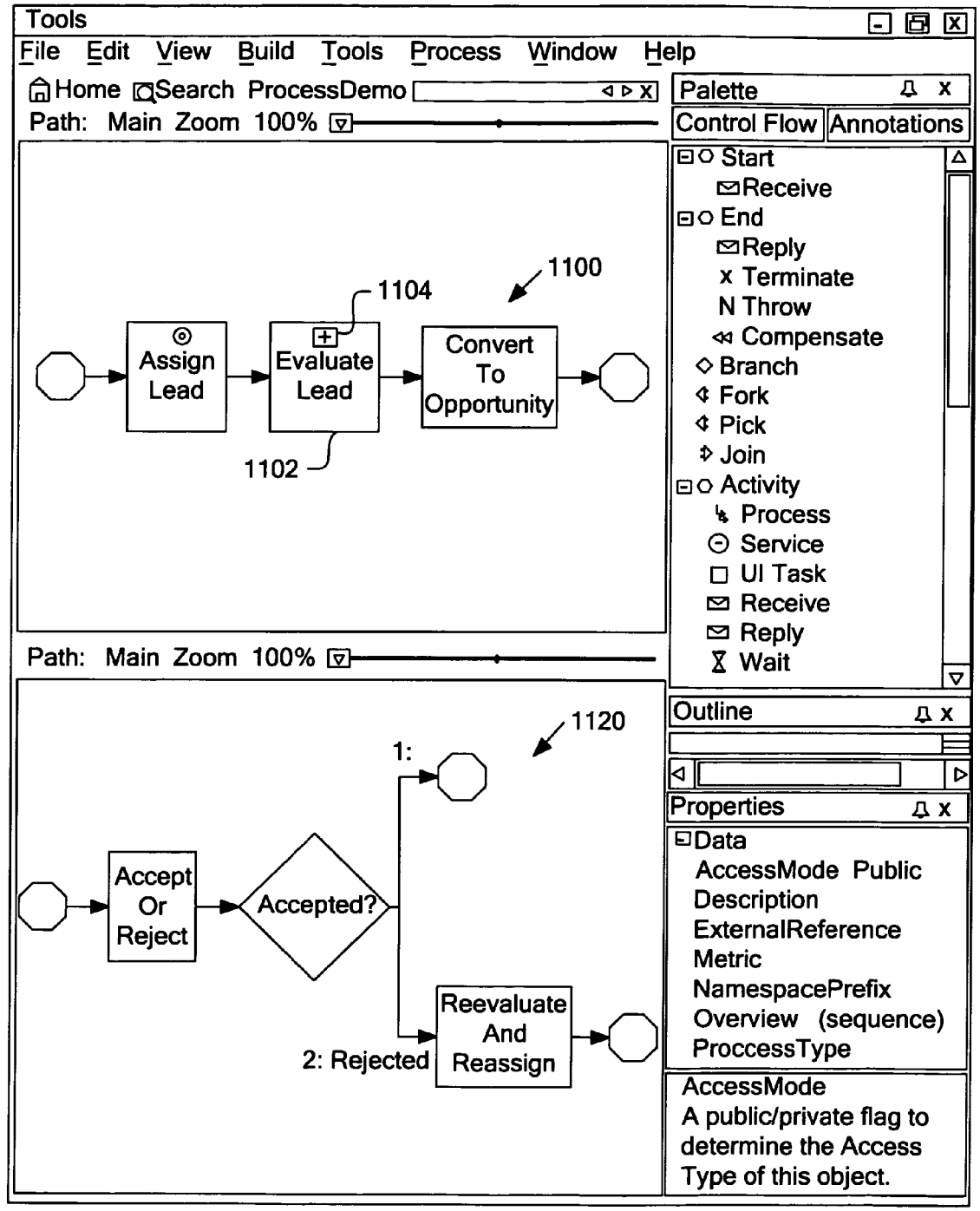

Referring to FIG. 11, the business analyst adds a second level of details for activity 1102 in the control flow 1100, as can be recursively done to $n^{th}$ level of detail. The addition of the plus icon 1004 to the rectangular box for the activity 1102 denotes the presence of the second level of details. The lower window represents details 1120 for the activity 1102.

Figure 12:
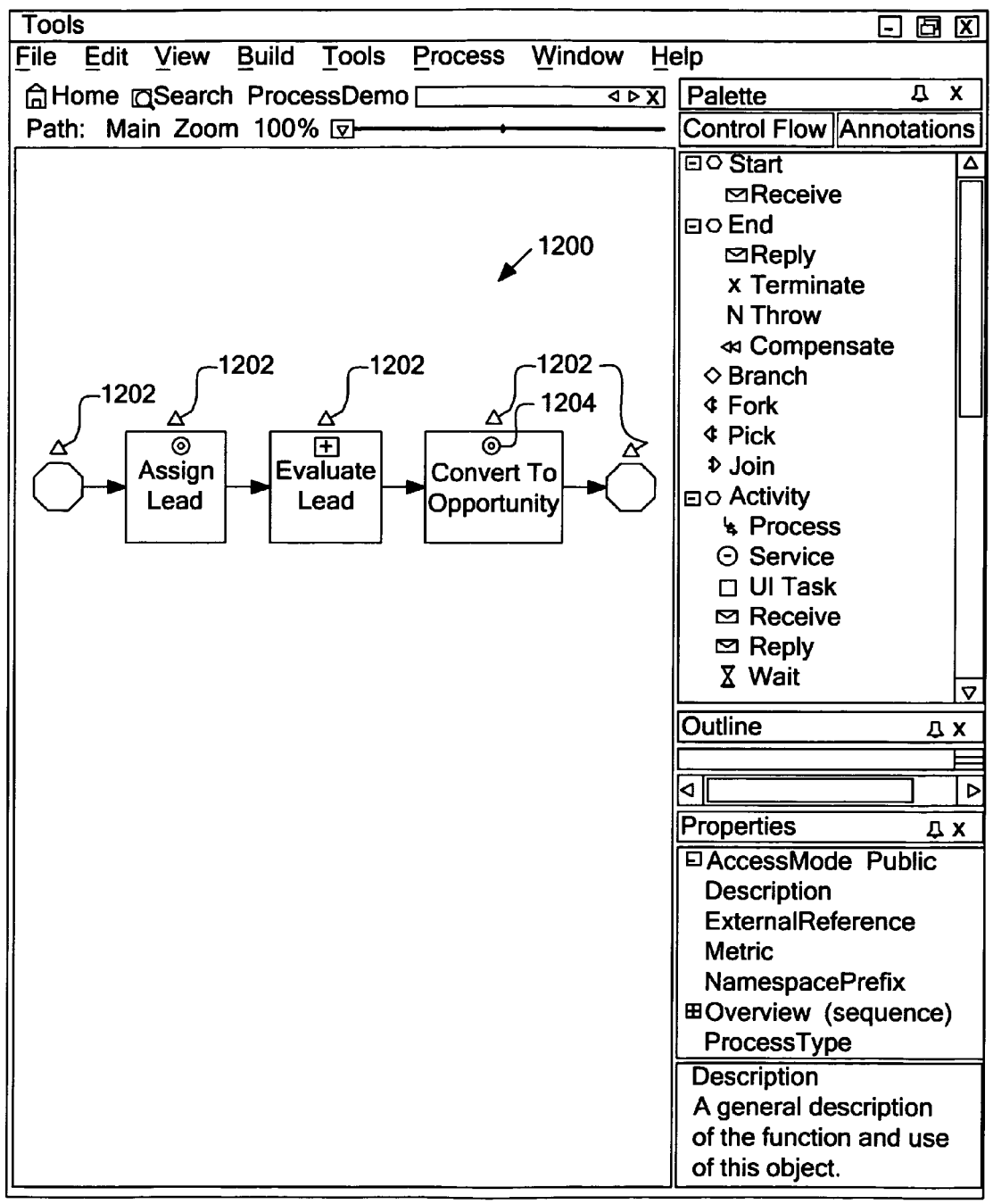

FIG. 12 illustrates a business process view 1200 presented to a software developer. The presence of pencil icons 1202 on top of the rectangular boxes indicates that the corresponding activities have been specified by the business analyst in the specification mode. In the illustrated example, the software developer has specified that the activity "Convert To Opportunity" is a service as indicated by the addition of the gear icon 1204.

Figure 13:
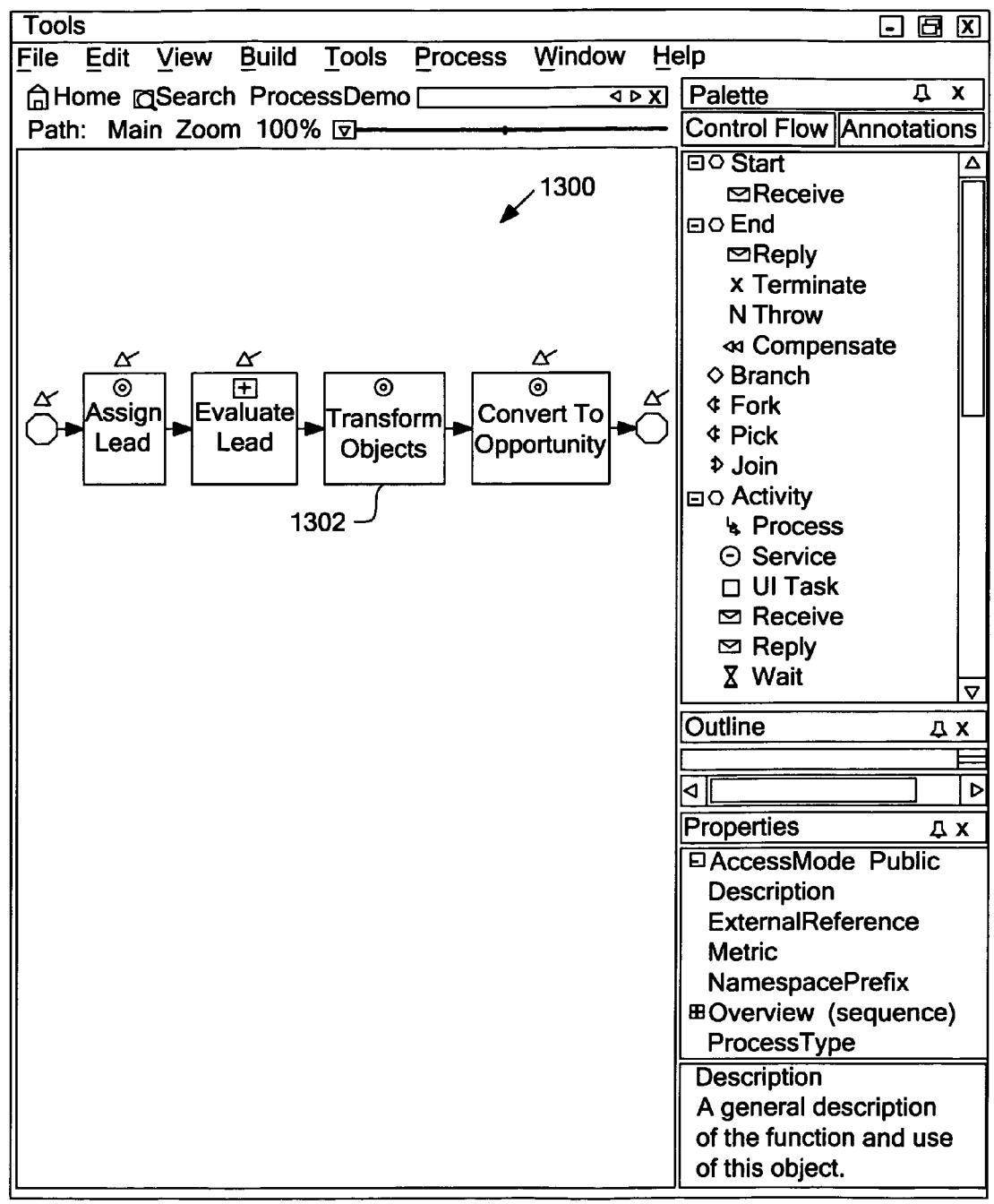

Referring to FIG. 13, the software developer adds an additional activity 1302 in the control flow 1300 as needed to make the business process executable. The absence of the pencil icon on top of the rectangle 1302 indicates that it has been added in the implementation mode.

Figure 14:
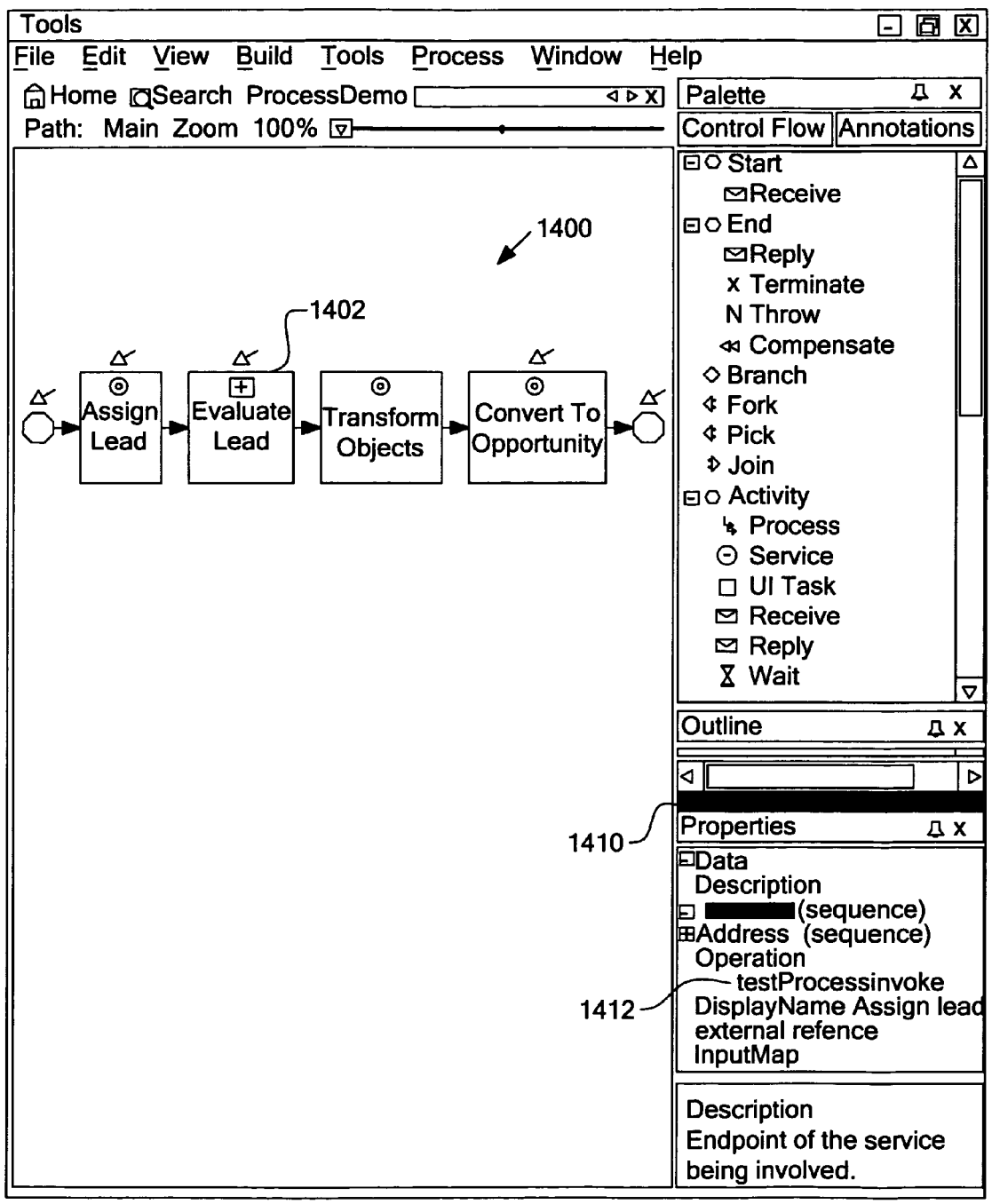

Referring to FIG. 14, the software developer specifies detailed behavior for the activities within the control flow 1400. In the illustrated example, the software developer has specified that activity 1402 (selected activity as indicated by the band with solid corners) uses "testProcessInvoke" 1412 as the operation, as can be seen in the Properties window 1410.

Figure 15:
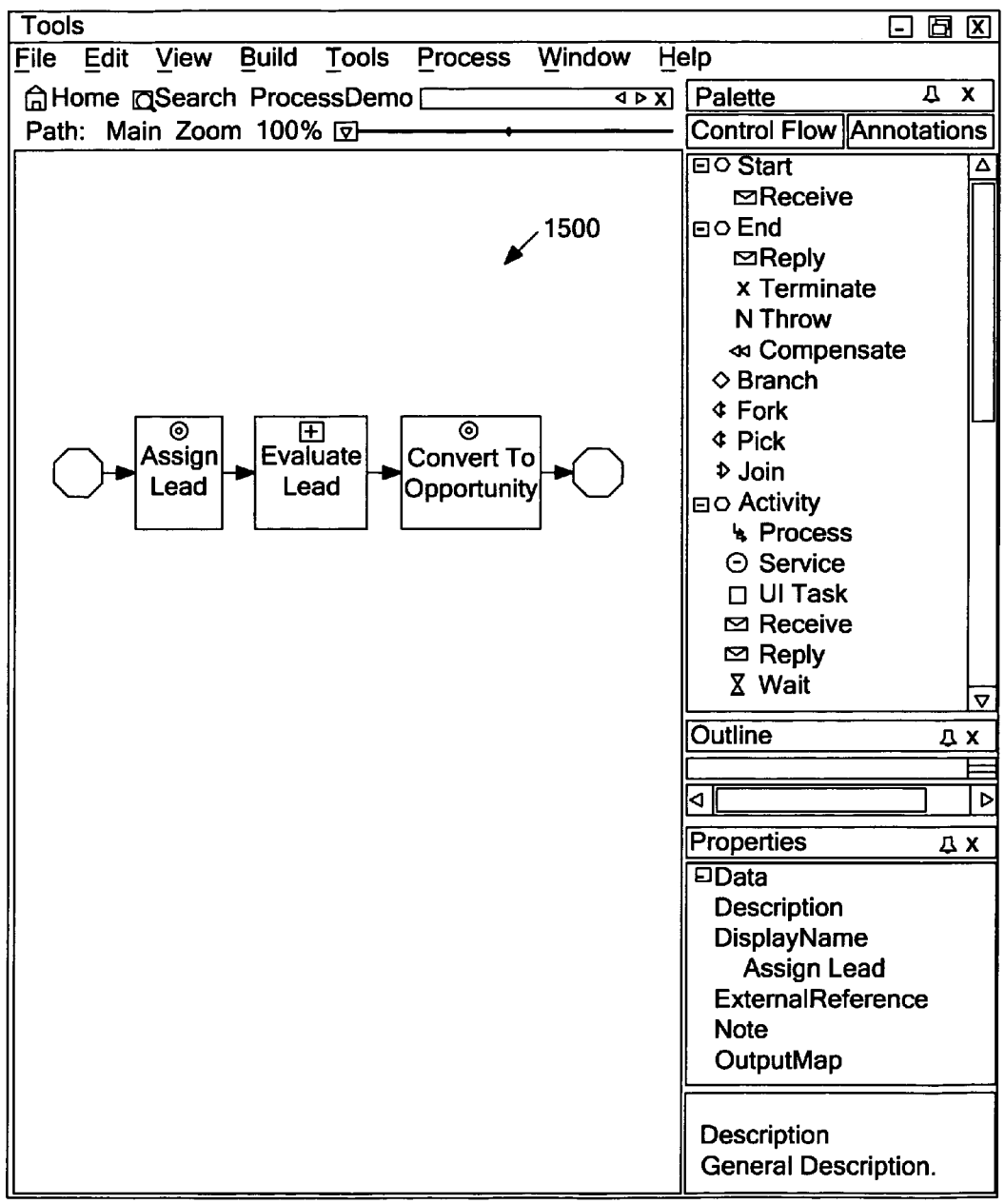

FIG. 15 illustrates a business process view 1500 presented to the business analyst who may continue working on the business process. All details added by the software developer are hidden in the view 1500 presented to the business analyst. Note the absence of the pencil icons on the Assign Lead and other activities, which indicates that this is a business analyst view. In addition, the "Transform Objects" rectangle is absent as it was added by the software developer. The gear icon added to the "Convert to Opportunity" rectangle by the software developer to indicate that the "Convert to Opportunity" is a service is also hidden from the business analyst. Further, in the Properties window, the operation and other properties that were seen in the software developer view have been hidden from the business analyst because these implementation level details are not considered relevant to the business analyst.

Exemplary Computer System

Figure 16:
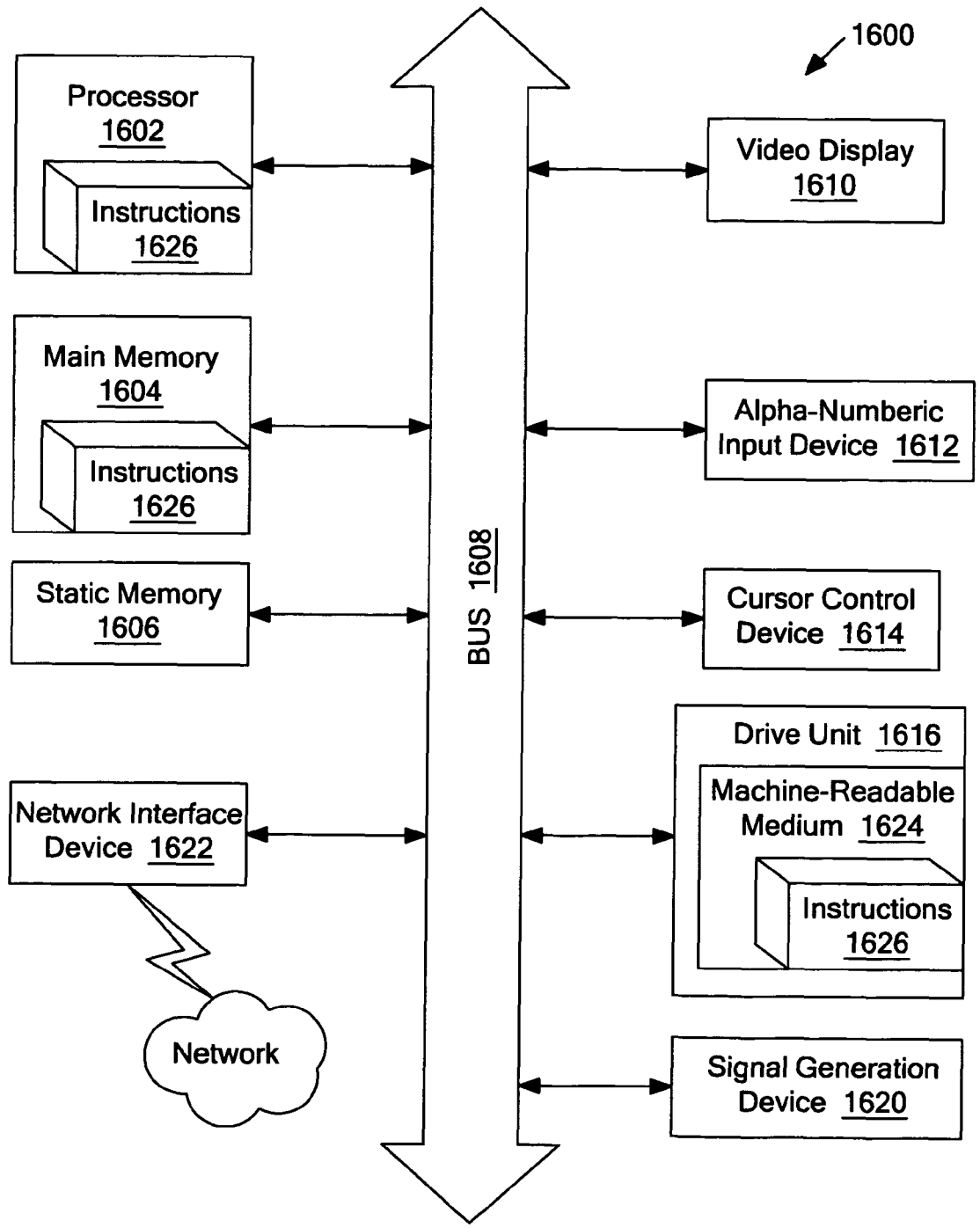
FIG. 16 is a block diagram of an exemplary computer system that may be used to perform one or more of the operations described herein.

FIG. 16 is a block diagram of an exemplary computer system 1600 (e.g., a server hosting the business process definition controller 100 of FIG. 1) that may be used to perform one or more of the operations described herein. In alternative embodiments, the machine may comprise a network router, a network switch, a network bridge, Personal Digital Assistant (PDA), a cellular telephone, a web appliance or any machine capable of executing a sequence of instructions that specify actions to be taken by that machine.

The computer system 1600 includes a processor 1602, a main memory 1604 and a static memory 1606, which communicate with each other via a bus 1508. The computer system 1600 may further include a video display unit 1610 (e.g., a liquid crystal display (LCD) or a cathode ray tube (CRT)). The computer system 1600 also includes an alpha-numeric input device 1612 (e.g., a keyboard), a cursor control device 1614 (e.g., a mouse), a disk drive unit 1616, a signal generation device 1620 (e.g., a speaker) and a network interface device 1622.

The disk drive unit 1616 includes a computer-readable medium 1624 on which is stored a set of instructions (i.e., software) 1626 embodying any one, or all, of the methodologies described above. The software 1626 is also shown to reside, completely or at least partially, within the main memory 1604 and/or within the processor 1602. The software 1626 may further be transmitted or received via the network interface device 1622. For the purposes of this specification, the term "computer-readable medium" shall be taken to include any medium that is capable of storing or encoding a sequence of instructions for execution by the computer and that cause the computer to perform any one of the methodologies of the present invention. The term "computer-readable medium" shall accordingly be taken to include, but not be limited to, solid-state memories, optical and magnetic disks, and carrier wave signals.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

What is claimed is:

1. A method in a computer system comprising:
    establishing a first class of users, wherein
        the first class of users corresponds to a first phase of a business process definition;
    establishing a second class of users, wherein
        the second class of users corresponds to a second phase of the business process definition;
    exposing only a subset of details of the business process definition to the first class of users, wherein
        the subset of details is part of the first phase, and
        the subset of details is limited to details of the business process definition specific to the first phase;
    excluding the second class of users from exposure to the subset of details;
    receiving business process data for the first phase from the first class of users;
    creating, using a processor of the computer system, a model of a business process using the business process data received from the first class of users;
    receiving business process data for the second phase from the second class of users;
    augmenting the model of the business process based on the business process data received from the second class of users; and
    iteratively refining the model of the business process in response to input provided by at least one of the first class of users and the second class of users.

2. The method of claim 1 wherein:
    the first class of users represents business analysts; and
    the first phase of the business process definition is a specification of the business process.

3. The method of claim 1 wherein:
    the second class of users represents software developers; and
    the second phase of the business process definition is an implementation of the business process.

4. The method of claim 1 further comprising:
    receiving business process data for a third phase of the business process definition from a third class of users;
    augmenting the model of the business process based on the business process data received from the third class of users.

5. The method of claim 4 wherein:
    the third class of users represents consultants familiar with requirements of a customer; and
    the third phase of the business process definition is a customization of the business process.

6. The method of claim 1 further comprising:
    collecting execution statistics for the business process; and
    presenting the execution statistics to at least one of the first and second classes of users to assist in refinement of the model.

7. The method of claim 1 wherein the model of the business process includes a set of model elements and associations defining relationships between the model elements from the set.

8. The method of claim 7 further comprising:
    tracing model elements and associations for the first class of users and model elements and associations for the second class of users.

9. The method of claim 7 further comprising:
    preventing the first class of users from modifying model elements and associations for the second class of users; and
    preventing the second class of users from modifying model elements and associations for the first class of users.

10. The method of claim 7 further comprising:
    creating different usage patterns from a subset of model elements for different phases of model refinement.

11. The method of claim 8 further comprising:
    providing multiple view points of the model to different classes of users.

12. The method of claim 1 wherein receiving business process data for the second phase of the business process definition comprises:
    receiving business process data for different execution targets from different users within the second class.

13. The method of claim 12 further comprising:
    tracing model elements and associations for different execution targets.

14. The method of claim 13 further comprising:
    providing multiple view points of the model for different execution targets.

15. A machine-readable medium having executable instructions to cause a machine to perform a method comprising:
    establishing a first class of users, wherein the first class of users corresponds to a first phase of a business process definition;
    establishing a second class of users, wherein
        the second class of users corresponds to a second phase of the business process definition;
    exposing only a subset of details of the business process definition to the first class of users, wherein
        the subset of details is part of the first phase, and
        the subset of details is limited to details of the business process definition specific to the first phase;
    excluding the second class of users from exposure to the subset of details;
    receiving business process data for the first phase from the first class of users;
    creating a model of a business process using the business process data received from the first class of users;
    receiving business process data for the second phase from the second class of users;
    augmenting the model of the business process based on the business process data received from the second class of users; and
    iteratively refining the model of the business process in response to input provided by at least one of the first class of users and the second class of users.

16. The machine-readable medium of claim 15 wherein:
    the first class of users represents business analysts;
    the first phase of the business process definition is a specification of the business process;
    the second class of users represents software developers; and
    the second phase of the business process definition is an implementation of the business process.

17. The machine-readable medium of claim 15 wherein the method further comprises:
   collecting execution statistics for the business process; and
   presenting the execution statistics to at least one of the first and second classes of users to assist in refinement of the model.

18. The machine-readable medium of claim 15 wherein the model of the business process includes a set of model elements and associations defining relationships between the model elements from the set.

19. The machine-readable medium of claim 18 wherein the method further comprises:
   tracing model elements and associations for the first class of users and model elements and associations for the second class of users.

20. A system comprising:
   a memory; and
   at least one processor coupled to the memory, the at least one processor executing a set of instructions which cause the at least one processor to:
      establish a first class of users, wherein
         the first class of users corresponds to a first phase of a business process definition;
      establish a second class of users, wherein
         the second class of users corresponds to a second phase of the business process definition;
      expose only a subset of details of the business process definition to the first class of users, wherein
         the subset of details is part of the first phase, and
         the subset of details is limited to details of the business process definition specific to the first phase;
      exclude the second class of users from exposure to the subset of details;
      receive business process data for the first phase from the first class of users,
      create a model of a business process using the business process data received from the first class of users,
      receive business process data for the second phase from the second class of users,
      augment the model of the business process based on the business process data received from the second class of users, and
      iteratively refine the model of the business process in response to input provided by at least one of the first class of users and the second class of users.

21. The system of claim 20 wherein:
   the first class of users represents business analysts;
   the first phase of the business process definition is a specification of the business process;
   the second class of users represents software developers; and
   the second phase of the business process definition is an implementation of the business process.

22. The system of claim 20 wherein the set of instructions further cause the at least one processor to
   collect execution statistics for the business process, and
   present the execution statistics to at least one of the first and second classes of users to assist in refinement of the model.

23. A computer-implemented apparatus comprising:
   means for establishing a first class of users, wherein
      the first class of users corresponds to a first phase of a business process definition;
   means for establishing a second class of users, wherein
      the second class of users corresponds to a second phase of the business process definition;
   means for exposing only a subset of details of the business process definition to the first class of users, wherein
      the subset of details is part of the flat phase, and
      the subset of details is limited to details of the business process definition specific to the first phase;
   means for excluding the second class of users from exposure to the subset of details;
   means for receiving business process data for the first phase from the first class of users;
   means for creating a model of a business process using the business process data received from the first class of users;
   means for receiving business process data for the second phase from the second class of users;
   means for augmenting the model of the business process based on the business process data received from the second class of users; and
   means for iteratively refining the model of the business process in response to input provided by at least one of the first class of users and the second class of users.

* * * * *

UNITED STATES PATENT AND TRADEMARK OFFICE
CERTIFICATE OF CORRECTION

| | | |
|---|---|---|
| PATENT NO. | : 7,809,597 B2 | |
| APPLICATION NO. | : 11/123460 | |
| DATED | : October 5, 2010 | |
| INVENTOR(S) | : Manoj Das et al. | |

It is certified that error appears in the above-identified patent and that said Letters Patent is hereby corrected as shown below:

Sheet 14 of 16, in Figure 14, below Ref. Numeral 1412, line 2, delete "refence" and insert -- reference --, therefor.

Sheet 16 of 16, in Figure 16, below Ref. Numeral 1612, line 1, delete "Numberic" and insert -- Numeric --, therefor.

In column 3, line 60, delete "a," and insert -- a --, therefor.

In column 18, line 25, in claim 23, delete "flat" and insert -- first --, therefor.

Signed and Sealed this
Seventh Day of June, 2011

David J. Kappos
*Director of the United States Patent and Trademark Office*